(12) United States Patent
Meunier (10) Patent No.: US 9,723,850 B2
(45) Date of Patent: Aug. 8, 2017

(54) FACILITY FOR MANUFACTURING A RESTRUCTURED MEAT ELEMENT

(71) Applicant: Convivial, Creuzier le Vieux (FR)

(72) Inventor: Jean Meunier, Bellerive (FR)

(73) Assignee: Convivial, Creuzier le Vieux (FR)

( * ) Notice: Subject to any disclaimer, the term of this patent is extended or adjusted under 35 U.S.C. 154(b) by 187 days.

(21) Appl. No.: 14/421,691

(22) PCT Filed: Aug. 20, 2013

(86) PCT No.: PCT/FR2013/051951
§ 371 (c)(1),
(2) Date: Feb. 13, 2015

(87) PCT Pub. No.: WO2014/029946
PCT Pub. Date: Feb. 27, 2014

(65) Prior Publication Data
US 2015/0201631 A1 Jul. 23, 2015

(30) Foreign Application Priority Data
Aug. 24, 2012 (FR) ..................................... 12 57983

(51) Int. Cl.
*A22C 18/00* (2006.01)
*A23L 1/317* (2006.01)
(Continued)

(52) U.S. Cl.
CPC .............. *A22C 18/00* (2013.01); *A22C 7/00* (2013.01); *A22C 7/0023* (2013.01); *A23L 13/03* (2016.08); *A23L 13/67* (2016.08)

(58) Field of Classification Search
CPC ......... A22C 7/003; A22C 7/00; A22C 7/0023; A22C 7/0076; A22C 18/00; A22C 7/0084;
(Continued)

(56) References Cited

U.S. PATENT DOCUMENTS 4,192,899 A * 3/1980 Roth ...................... A22C 7/00
426/143
4,193,272 A * 3/1980 Bernard ................. A22C 7/00
425/316
(Continued)

FOREIGN PATENT DOCUMENTS

JP      2001038681 A    2/2001
WO      2007085773 A1   8/2007
WO      2010006893 A1   1/2010

*Primary Examiner* — Alison L Hindenlang
*Assistant Examiner* — Jerzi H Moreno Hernandez
(74) *Attorney, Agent, or Firm* — Jacox, Meckstroth & Jenkins (57) ABSTRACT

A facility that includes a means for forming meat fragments, and a movable support for the meat fragments, which is to convey said meat fragments in a longitudinal direction, through a means for cohesively compacting meat fragments to form a block of compacted meat fragments. The cohesive compaction means includes two movable compaction shoes for compacting the meat fragments between the movable support and said shoes. The shoes are mutually transversely offset relative to the longitudinal direction of conveyance. The shoes are each driven in a vertical alternating movement, such that the pads move relative to one another and out of phase with each other.

22 Claims, 4 Drawing Sheets (51) Int. Cl.
*A22C 7/00* (2006.01)
*A23L 13/00* (2016.01)
*A23L 13/60* (2016.01)

(58) Field of Classification Search
CPC ..... B26D 2210/04; A23L 13/03; A23L 13/67; A23L 13/55; A23L 13/52; A23L 17/70; A23L 13/60; A23P 10/25
See application file for complete search history.

(56) References Cited

U.S. PATENT DOCUMENTS

| | | |
|---|---|---|
| 4,460,611 A | 7/1984 | Suzuki |
| 4,548,571 A | 10/1985 | Suzuki |
| 4,552,523 A | 11/1985 | Suzuki |
| 5,421,168 A * | 6/1995 | Reynolds ................. A23G 9/18 62/332 |
| 5,431,942 A * | 7/1995 | Baird ....................... A22C 7/00 425/417 |
| 7,217,117 B2 | 5/2007 | Le Paih |
| 8,475,861 B2 | 7/2013 | Meunier |
| 2004/0155129 A1 | 8/2004 | Le Paih |
| 2009/0220660 A1 | 9/2009 | Meunier |
| 2011/0206814 A1 | 8/2011 | Le Paih |
| 2012/0269935 A1* | 10/2012 | Arevalo ................. G01N 33/10 426/231 |

* cited by examiner

FACILITY FOR MANUFACTURING A RESTRUCTURED MEAT ELEMENT

CROSS-REFERENCE TO RELATED APPLICATIONS

This application is the U.S. National Phase application of PCT Application No. PCT/FR2013/051951 filed Aug. 20, 2013, which claims priority to the French application 1257983 filed on Aug. 24, 2012, which applications are incorporated herein by reference and made a part hereof.

BACKGROUND OF THE INVENTION

1. Field of the Invention

The present invention relates to the field of manufacturing a restructured meat element.

2. Description of the Related Art

Already known from the prior art, in particular from WO 2007/085773, which is equivalent to U. S. Publication No. 2009/0220660 and to U.S. Pat. No. 8,475,861, is a facility for manufacturing a restructured meat element, of the type comprising:
  means for forming fragments of meat, and
  a moving support for the fragments of meat designed to convey these fragments of meat in a longitudinal direction, through means for cohesively tamping the fragments of meat to form a block of tamped fragments of meat.

It is generally desired that a piece of restructured meat retain, as far as possible, with respect to mastication of the latter by a consumer, properties similar to those of a piece of non-destructured meat.

This is obtained in particular by preserving—as well as possible—the structure of the lipocytes and myofibrils of the meat, whose diameter is generally less than 50 micrometers.

The means for forming fragments of meat proposed in WO 2007/085773 make it possible to preserve, relatively satisfactorily, the structure of the lipocytes and of the myofibrils, by forming fragments of meat such that each fragment is in the general shape of a sheet having a surface area between 5 and 10 $cm^2$ and a thickness between 3 and 9 tenths of a mm.

The means for cohesively tamping the fragments of meat proposed in WO 2007/085773 comprise two conveyor belts for cohesively tamping the fragments of meat. The two tamping belts are arranged one above the other such that the lower belt extends substantially horizontally and the upper belt is inclined with respect to the lower belt. The two tamping conveyor belts converge from upstream to downstream with respect to the direction of motion of the fragments of meat between these belts so as to cohesively tamp the fragments of meat.

The means for forming fragments of meat proposed in WO 2007/085773, which is equivalent to U. S. Publication No. 2009/0220660 and to U.S. Pat. No. 8,475,861, make it possible to preserve, relatively satisfactorily, the structure of the lipocytes and of the myofibrils, by forming fragments of meat such that each fragment is in the general shape of a sheet having a surface area between 5 and 10 $cm^2$ and a thickness between 3 and 9 tenths of a mm.

The means for cohesively tamping the fragments of meat proposed in WO 2007/085773, which is equivalent to U. S. Publication No. 2009/0220660 and to U.S. Pat. No. 8,475,861, comprise two conveyor belts for cohesively tamping the fragments of meat. The two tamping belts are arranged one above the other such that the lower belt extends substantially horizontally and the upper belt is inclined with respect to the lower belt. The two tamping conveyor belts converge from upstream to downstream with respect to the direction of motion of the fragments of meat between these belts so as to cohesively tamp the fragments of meat.

The means for cohesively tamping the fragments of meat proposed in WO 2007/085773, which is equivalent to U. S. Publication No. 2009/0220660 and to U.S. Pat. No. 8,475,861, are generally effective. However, there is a desire to further optimize their effectiveness.

SUMMARY OF THE INVENTION

The invention has in particular the object of optimizing the operation of the means for cohesively tamping the fragments of meat.

To that end, the invention relates to a facility for manufacturing a restructured meat element, of the type comprising:
  means for forming fragments of meat, and
  a moving support for the fragments of meat designed to convey these fragments of meat in a longitudinal direction, through means for cohesively tamping the fragments of meat to form a block of tamped fragments of meat,
characterized in that the cohesive tamping means comprise:
  two moving shoe for tamping the fragments of meat between the moving support and these shoe, the shoe being offset with respect to one another transversely with respect to the longitudinal conveying direction, and
  means for driving the shoes, each following an alternating vertical movement such that the shoes move out of phase with respect to one another.

In the above and below, the vertical direction is that defined by gravity.

It will be noted that the cohesive tamping means equipped with the two shoes defined above are relatively effective by virtue of the fact that the shoes act on regions which are offset transversely from the block of tamped fragments of meat being formed, and are out of phase with respect to one another.

The out of phase vertical alternating movements of the two shoes transmit, to the block of tamped fragments of meat being formed, adequately distributed tamping forces.

According to other optional features of the invention:
  each shoe has a contact surface with the fragments of meat, which surface is formed so as to tamp in the direction of a reduction in the transverse dimensions of the block of tamped fragments of meat being formed;
  the contact surface with the fragments of meat is substantially curved about an axis parallel to the longitudinal conveying direction;
  the shoes are aligned transversely from the longitudinal conveying direction;
  the means for alternating the vertical movement of the shoes comprise fluid actuator means, for example two actuators respectively connected to the two tamping shoes;
  the cohesive tamping means comprise means for leveling the block of tamped fragments of meat being formed, arranged upstream of the tamping shoes with respect to a moving direction of the fragments of meat through the means for cohesively tamping the fragments of meat, these leveling means comprising a leveling member designed to engage with the upper side of the block of tamped fragments of meat being formed, and means for driving the leveling member following an oscillating rocking motion;

the leveling member is in the general shape of a rake equipped with tines comprising free ends designed to engage with the upper side of the block of tamped fragments of meat being formed;

the means for driving the leveling member comprise a rotary drive motor and means for transforming the rotary motion of the motor into a rocking motion of the leveling member, these motion transforming means comprising a crank equipped with a first end connected to a rotary shaft of the drive motor and with a second end connected to a crank pin designed to slide in a straight rail connected to a rocking shaft of the leveling member;

the moving support for fragments of meat comprises a conveyor belt;

the cohesive tamping means comprise two conveyor belts for cohesively tamping the fragments of meat converging from upstream to downstream with respect to the motion direction of the fragments of meat through the means for cohesively tamping the fragments of meat, the two tamping belts being arranged one above the other, the lower tamping belt being formed by the moving support for fragments of meat.

These and other objects and advantages of the invention will be apparent from the following description, the accompanying drawings and the appended claims.

BRIEF DESCRIPTION OF THE ACCOMPANYING DRAWINGS

The invention will be better understood upon reading the following purely exemplary description with reference to the drawings, in which.

DETAILED DESCRIPTION OF THE PREFERRED EMBODIMENTS

Figure 1:
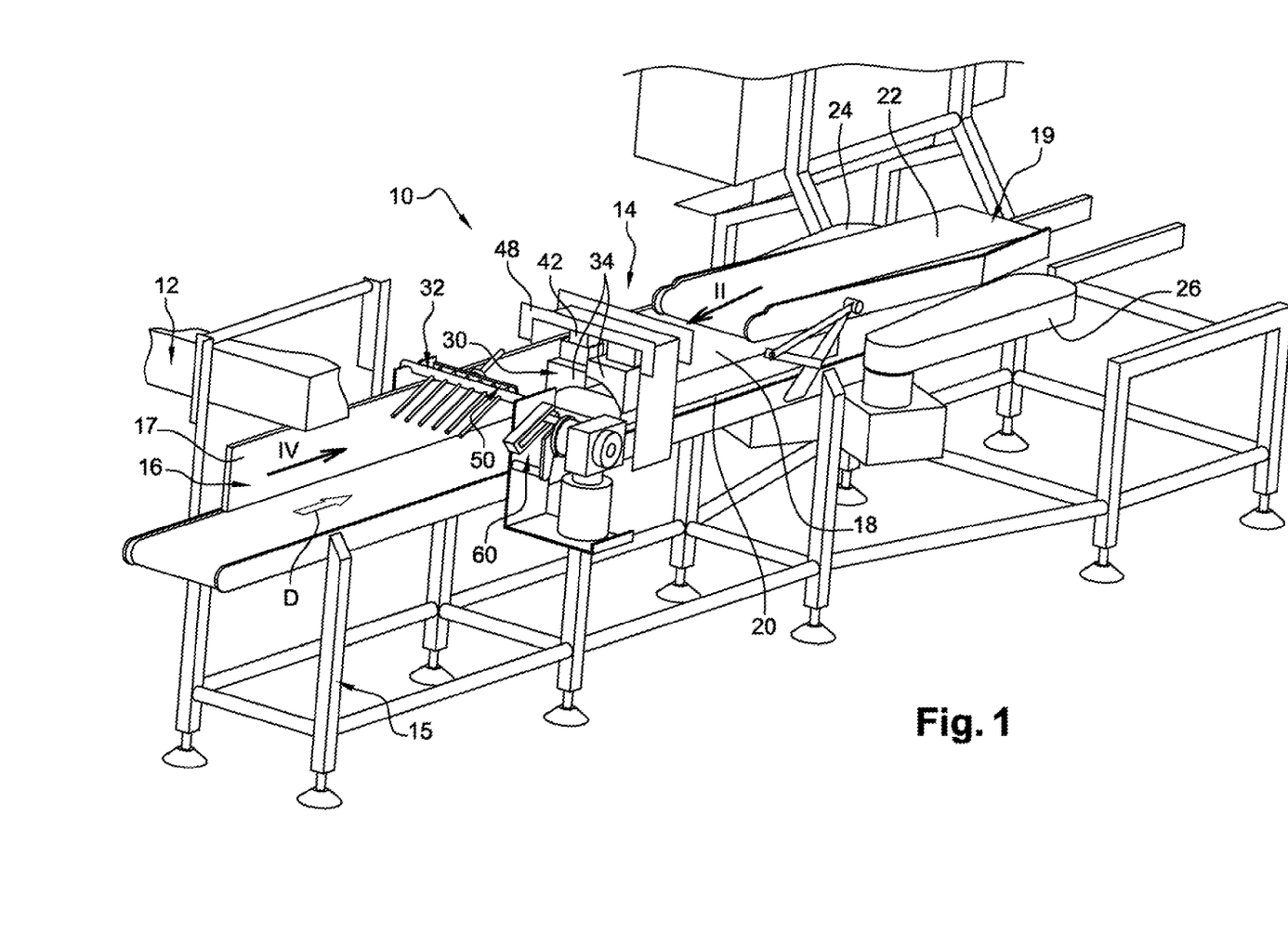
FIG. 1 is a perspective view of a facility for manufacturing a restructured meat element according to the invention.

FIG. 1 shows a facility for manufacturing a restructured meat element, according to the invention, designated by the general reference 10.

This facility 10 comprises various means, which will be described hereafter, creating a route for the meat from an upstream end, where the fragments of destructured meat are produced, to a downstream end, where the elements of restructured meat are collected. The left-right direction of FIG. 1 corresponds to the upstream-downstream direction of the route taken by the meat.

The elements of restructured meat have for example a generally cylindrical shape. Of course, the base of the generally cylindrical shape is not necessarily circular and may in particular be ovoid. The elements of restructured meat, which are not shown in the figures, are of the classic type, for example as described in WO 2007/085773.

The facility 10 comprises, from upstream to downstream, means 12 for forming fragments of meat and means for transforming these fragments into elements of restructured meat. These transforming means comprise means 14 for cohesively tamping the fragments of meat, to form a block of tamped fragments of meat, as well as other conventional means which are described for example in WO 2007/085773. The cohesive tamping means 14 are borne by a frame 15.

The means 12 for forming fragments of meat are of the classic type and comprise means known per se for cooling and slicing pieces of meat obtained by butchering animals.

In the example shown, the means 12 form fragments of meat (not shown) such that each fragment is in the general shape of a sheet having a surface area between 5 and 10 cm$^2$ and a thickness between 3 and 9 tenths of a mm.

The fragments of meat are transported, using conventional means, from the forming means 12 to an upper opening of a receiver 16 into which the fragments of meat fall by gravity. The receiver 16, borne by the frame 15, is delimited in particular by two longitudinal vertical walls 17, only one of which being shown in FIG. 1 for reasons of clarity.

The frame 15 also bears a moving support for the fragments of meat. This moving support, which is shown in FIG. 1 and which will be described in more detail below, is designed to convey the fragments of meat in a longitudinal direction D, from the receiver 16 to the cohesive tamping means 14, to form a block of tamped fragments of meat.

Figure 2:
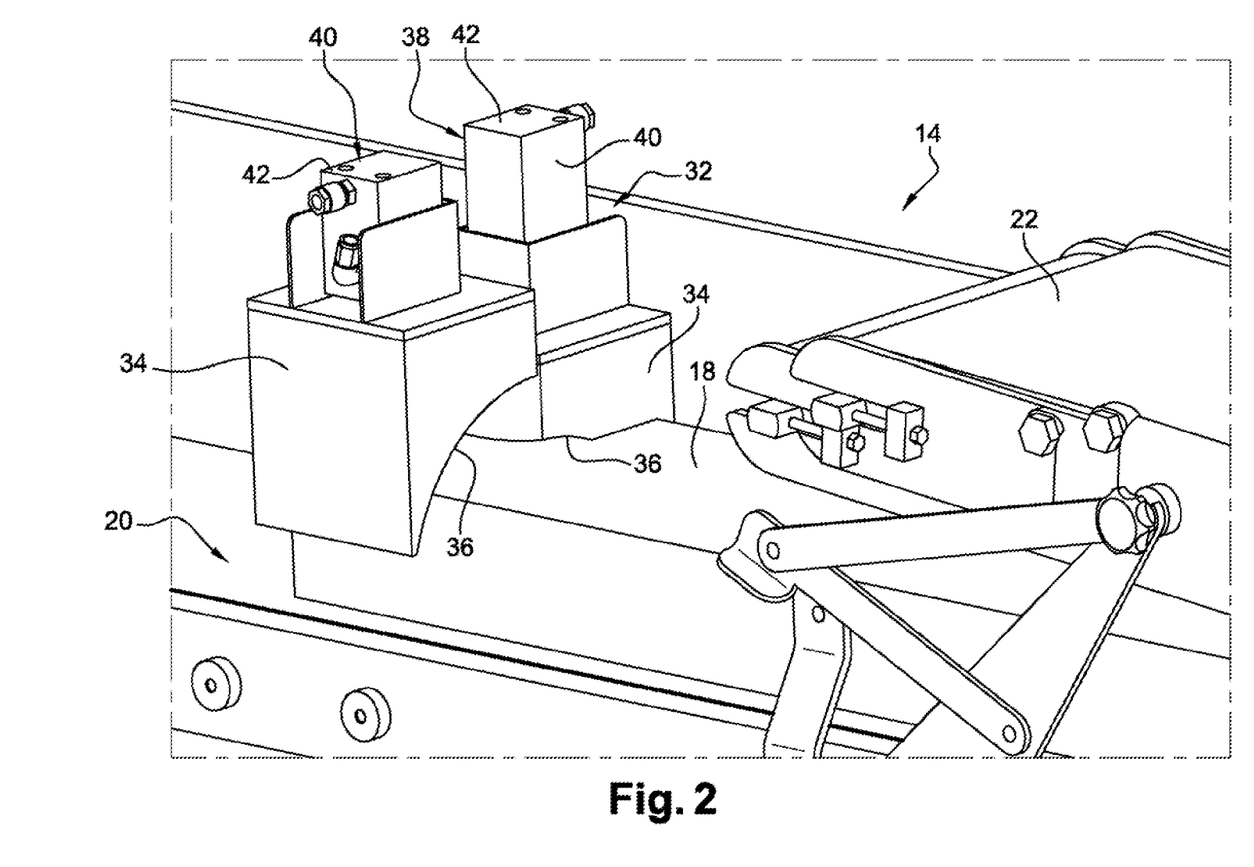
FIG. 2 is a detail perspective view, seen according to the arrow II of FIG. 1, showing the moving shoes of the cohesive tamping means of the facility of FIG. 1.
Figure 4:
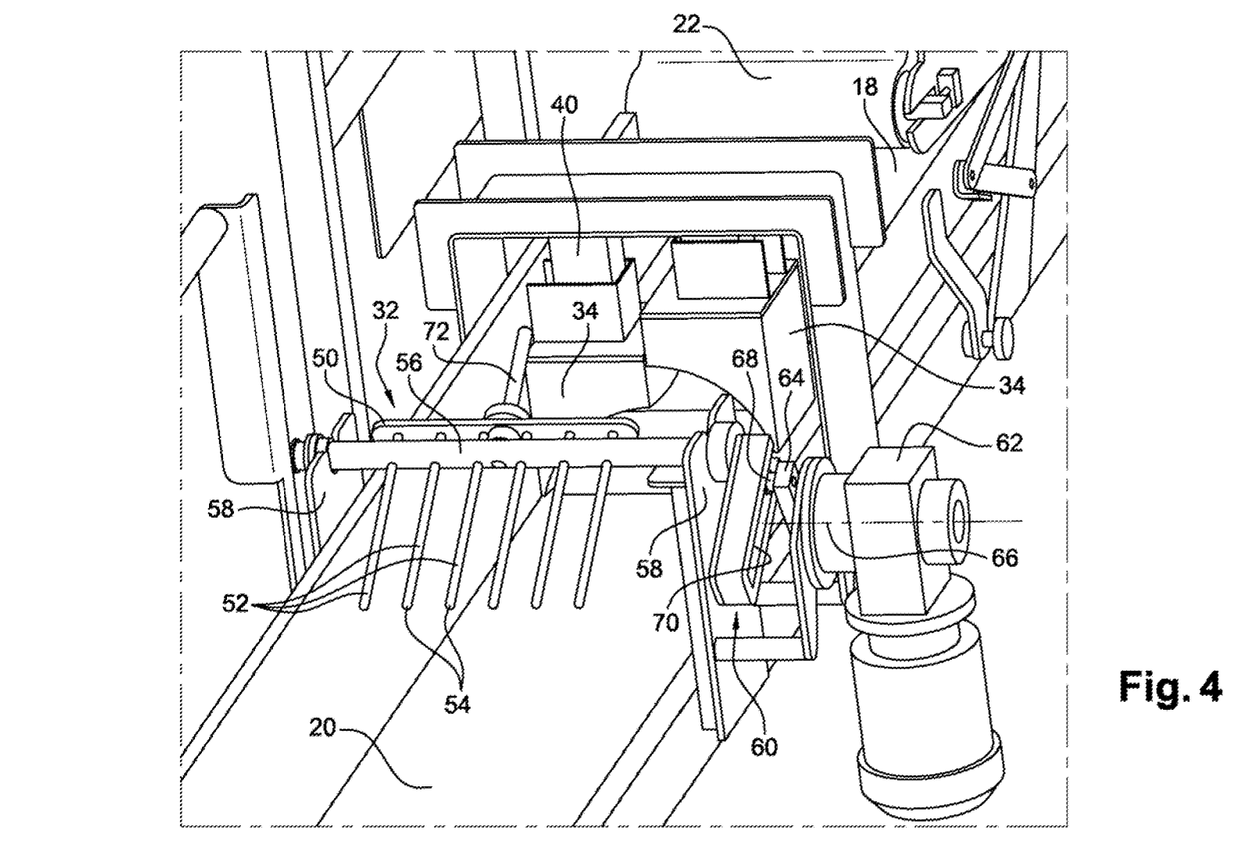
FIG. 4 is a detail perspective view, seen according to the arrow IV of FIG. 1, showing the leveling member of the facility of FIG. 1.

FIGS. 1, 2 and 4 show a block of tamped fragments of meat being formed, designated by the reference 18.

The means 14 for cohesively tamping the fragments of meat comprise means 19 with conveyor belts comprising two conveyor belts 20, 22 for cohesively tamping the fragments of meat. The two tamping belts 20, 22 are arranged one above the other such that the lower belt 20 extends substantially horizontally and the upper belt 22 is inclined with respect to the lower belt 20.

The two tamping belts 20, 22 converge from upstream to downstream with respect to the motion direction of the fragments of meat between these belts 20, 22 so as to enhance the cohesive tamping of the fragments of meat.

The means 19 with conveyor belts preferably also comprise two other conveyor belts 24, 26 for cohesively tamping the fragments of meat, arranged laterally on the left and the right of a space delimited by the two conveyor belts 20, 22. The two lateral tamping conveyor belts 24, 26 converge from upstream to downstream with respect to the motion direction of the fragments of meat between these belts 24, 26 so as to enhance the cohesive tamping of the fragments of meat.

It is to be noted that the lower belt 20 forms the bottom of the receiver 16 and bears the fragments of meat so as to transport them, parallel to the longitudinal conveying direction D, from this receiver 16 to a space between the four tamping conveyor belts 20, 22, 24, 26. The above-mentioned moving support for fragments of meat is thus formed by the lower tamping belt 20.

The means 14 for cohesively tamping the fragments of meat also comprise means 30 with tamping shoes, arranged upstream of the means 19 with conveyor belts, and leveling means 32, arranged upstream of the shoe means 30 with.

The shoe means 30 comprise two moving tamping shoes 34, shown in more detail in FIG. 2, designed to tamp the fragments of meat between the lower conveyor belt 20 (moving support) and these shoes 34.

The tamping shoes 34 are offset with respect to one another, transversely from respect to the longitudinal conveying direction of the fragments of meat through the cohesive tamping means 14.

The shoes 34 are preferably aligned transversely from the longitudinal conveying direction as is shown in FIGS. 1, 2 and 4.

As shown in particular in FIG. 2, each shoe 34 has a contact surface 36 with the fragments of meat, which surface is formed so as to tamp in the direction of a reduction in the transverse dimensions of the block 18 of tamped fragments of meat being formed. Thus, in the example shown, the contact surface 36 with the fragments of meat is substantially curved about an axis parallel to the longitudinal conveying direction.

The tamping shoes 34 are driven, with the aid of means 38, following an alternating vertical movement such that the shoes 34 move out of phase with respect to one another, preferably in phase opposition with respect to one another.

In the example shown, the drive means 38 comprise two substantially identical fluid actuators 40, more particularly pneumatic actuators, respectively connected to the tamping shoes 34. One actuator 40 is shown in more detail in FIG. 3. Each actuator 40 comprises a fixed body 42 in which a stem 44 is mounted such that it can move in vertical translation. The free end 46 of the stem 44 is connected in a manner known per se to a corresponding shoe 34.

The bodies 42 of the two actuators 40 are connected, in a manner known per se, to a fixed portal 48, shown in FIG. 1, which is secured to the frame 15.

Figure 3:
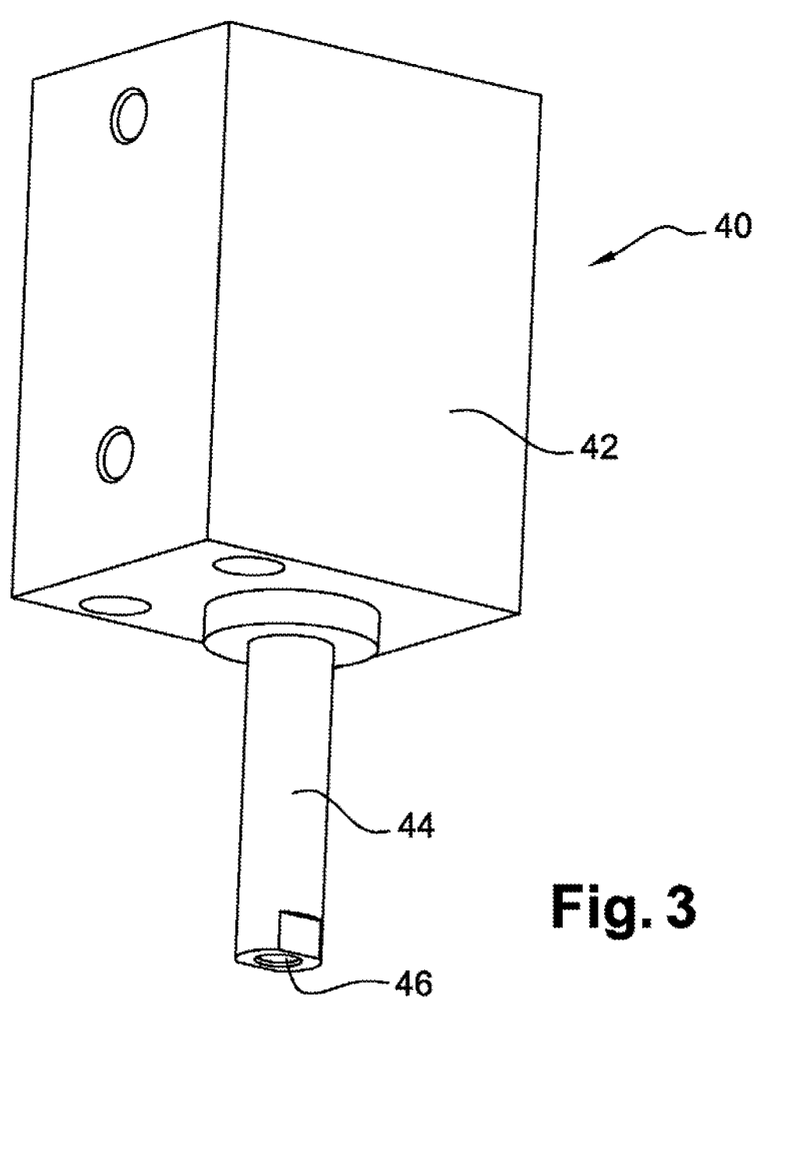
FIG. 3 is a perspective view of a hydraulic actuator of the displacement means of one of the shoes.

The actuators 40 are controlled, with the aid of means known per se, so as to execute the phase-shifted alternating vertical movements of the two tamping shoes 34.

As a variant, the drive means 38 could comprise, instead of the actuators 40, a crankshaft causing the out of phase alternating movement of the shoes 34.

The leveling means 32 comprise a leveling member 50 designed to engage with the top of the block of tamped fragments of meat being formed. The leveling member 50 is preferably in the general shape of a rake, as shown in FIGS. 1 and 4, equipped with tines 52. The free ends 54 of the tines 52 are designed to engage with the top of the block of tamped fragments of meat being formed.

The leveling member 50 is borne by a shaft 56 whose axis is substantially transverse to the longitudinal conveying direction and which is mounted so as to be able to rock on two flanges 58 which are secured to the frame 15. The leveling member 50 is driven following an oscillating rocking motion with the aid of means 60 shown in more detail in FIG. 4.

In the example shown, the drive means 60 comprise a rotary drive motor 62 and means for transforming the rotary motion of a shaft of the motor into a rocking motion of the leveling member 50.

The motion transforming means comprise a crank 64 equipped with a first end connected to a rotary shaft 66 (shown dash-dotted in FIG. 4) of the motor 62 and with a second end connected to a crank pin 68. This crank pin 68 is designed to slide in a channel forming a straight rail 70 connected to the rocking shaft 56 of the leveling member 50.

The rail 70 extends substantially radially from one end of the rocking shaft 56. The end of the rail 70 which is closest to the rocking shaft 56 is open such that it is possible, if necessary, to remove the crank pin 68 from the rail 70 or to engage the crank pin 68 in the rail 70.

The leveling member 50 is balanced about the axis created by the rocking shaft 56, for example with the aid of means 72 forming a counterweight to the tines 52.

In operation, the lower conveyor belt 20 transports the fragments of meat from the receptacle 16 through the cohesive tamping means 14.

First, the leveling member 50 levels, by virtue of its oscillating rocking motion, the upper surface of the block 18 of tamped fragments of meat being formed.

Then, the shoes 34 produce, by virtue of their out of phase alternating vertical movement, a tamping effect which reduces the transverse dimensions of the block 18 of tamped fragments of meat being formed.

Finally, the means 19 with conveyor belts complete the tamping of the block 18 of tamped fragments of meat.

The block 18 of tamped fragments of meat obtained with the above-described tamping means has a very satisfactory structure in which the mass of meat is adequately distributed, the shape of the block 18 of meat being relatively homogeneous.

Of course, the invention is not limited to the embodiment described above. In particular, the leveling means 32 could if necessary be omitted. Moreover, the means 19 with conveyor belts could be replaced with successive pairs of tamping shoes 34, wherein the surfaces of the shoes 34 in contact with the fragments of meat could have profiles scalable from upstream to downstream in the facility 10.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A facility for manufacturing a restructured meat element comprising:
    means for forming fragments of meat, and
    a moving support for said fragments of meat designed to convey said fragments of meat in a longitudinal direction (D), through means for cohesively tamping said fragments of meat to form a block of tamped fragments of meat,
    wherein said cohesive tamping means comprise:
    two moving shoes for tamping said fragments of meat between said moving support and said two moving shoes, said two moving shoes being offset with respect to one another transversely with respect to said longitudinal conveying direction (D), and
    means for driving said two moving shoes, each following an alternating vertical movement such that said two moving shoes move out of phase with respect to one another.

2. The facility as claimed in claim 1, in which each of said two moving shoes has a contact surface with said fragments of meat, which surface is formed so as to tamp in a direction of a reduction in the transverse dimensions of said block of tamped fragments of meat being formed.

3. The facility as claimed in claim 2, in which said contact surface with said fragments of meat is substantially curved about an axis parallel to said longitudinal conveying direction (D).

4. The facility as claimed in claim 2, in which said two moving shoes are aligned transversely with respect to said longitudinal conveying direction (D).

5. The facility as claimed in claim 2, in which said means for the alternating vertical movement of said two moving shoes comprise fluid actuator means connected to said two moving shoes.

6. The facility as claimed in claim 3, in which said two moving shoes are aligned transversely with respect to said longitudinal conveying direction (D).

7. The facility as claimed in claim 3, in which said means for the alternating vertical movement of said two moving shoes comprise fluid actuator means connected to said two moving shoes.

8. The facility as claimed in claim 1, in which said two moving shoes are aligned transversely with respect to said longitudinal conveying direction (D).

9. The facility as claimed in claim 8, in which said means for the alternating vertical movement of said two moving shoes comprise fluid actuator means connected to said two moving shoes.

10. The facility as claimed in claim 1, in which at least one actuator for the alternating vertical movement of said two moving shoes comprises fluid actuator means connected to said two moving shoes.

11. The facility as claimed in claim 10, wherein said fluid actuator means comprises two actuators, respectively, connected to said two moving shoes.

12. The facility as claimed in claim 1, in which said moving support for said fragments of meat comprises a conveyor belt.

13. The facility as claimed in claim 12, in which said cohesive tamping means comprise two conveyor belts for cohesively tamping said fragments of meat converging from upstream to downstream with respect to the motion direction of said fragments of meat through said cohesive tamping means for cohesively tamping said fragments of meat, said two conveyor belts being arranged one above the other, a lower tamping belt being formed by said moving support for said fragments of meat.

14. A facility for manufacturing a restructured meat element comprising:
    means for forming fragments of meat, and
    a moving support for said fragments of meat designed to convey said fragments of meat in a longitudinal direction (D), through means for cohesively tamping said fragments of meat to form a block of tamped fragments of meat,
    wherein said cohesive tamping means comprise:
    two moving shoes for tamping said fragments of meat between said moving support and said two moving shoes, said two moving shoes being offset with respect to one another transversely with respect to said longitudinal conveying direction (D), and
    means for driving said two moving shoes, each following an alternating vertical movement such that said two moving shoes move out of phase with respect to one another;
    wherein said cohesive tamping means comprise means for leveling said block of tamped fragments of meat being formed, arranged upstream of said two moving shoes with respect to a direction of motion of said fragments of meat through said cohesive tamping means for cohesively tamping said fragments of meat, said leveling means comprising a leveling member designed to engage with the upper side of said block of tamped fragments of meat being formed, and means for driving said leveling member following an oscillating rocking motion.

15. The facility as claimed in claim 14, in which said leveling member is in the shape of a rake equipped with tines comprising free ends designed to engage with the top of said block of tamped fragments of meat being formed.

16. The facility as claimed in claim 14, in which said means for driving said leveling member comprise a rotary drive motor and means for transforming the rotary motion of said rotary drive motor into a rocking motion of said leveling member, these motion transforming means comprising a crank equipped with a first end connected to a rotary shaft of said rotary drive motor and with a second end connected to a crank pin designed to slide in a straight rail secured to a rocking shaft of said leveling member.

17. The facility as claimed in claim 15, in which said means for driving said leveling member comprise a rotary drive motor and means for transforming the rotary motion of said rotary drive motor into a rocking motion of said leveling member, these motion transforming means comprising a crank equipped with a first end connected to a rotary shaft of said rotary drive motor and with a second end connected to a crank pin designed to slide in a straight rail secured to a rocking shaft of said leveling member.

18. A facility for manufacturing a restructured meat element comprising:
    means for forming fragments of meat, and
    a moving support for said fragments of meat designed to convey said fragments of meat in a longitudinal direction (D), through means for cohesively tamping said fragments of meat to form a block of tamped fragments of meat,
    wherein said cohesive tamping means comprise:
    two moving shoes for tamping said fragments of meat between said moving support and said two moving shoes, said two moving shoes being offset with respect to one another transversely with respect to said longitudinal conveying direction (D), and
    means for driving said two moving shoes, each following an alternating vertical movement such that said two moving shoes move out of phase with respect to one another;
    wherein each of said two moving shoes has a contact surface with said fragments of meat, which surface is formed so as to tamp in a direction of a reduction in the transverse dimensions of said block of tamped fragments of meat being formed;
    wherein said cohesive tamping means comprise means for leveling said block of tamped fragments of meat being formed, arranged upstream of said two moving shoes with respect to a direction of motion of said fragments of meat through said cohesive tamping means for cohesively tamping said fragments of meat, said leveling means comprising a leveling member designed to engage with the upper side of said block of tamped fragments of meat being formed, and means for driving said leveling member following an oscillating rocking motion.

19. A facility for manufacturing a restructured meat element comprising:
    means for forming fragments of meat, and
    a moving support for said fragments of meat designed to convey said fragments of meat in a longitudinal direction (D), through means for cohesively tamping said fragments of meat to form a block of tamped fragments of meat,
    wherein said cohesive tamping means comprise:
    two moving shoes for tamping said fragments of meat between said moving support and said two moving shoes, said two moving shoes being offset with respect to one another transversely with respect to said longitudinal conveying direction (D), and means for driving said two moving shoes, each following an alternating vertical movement such that said two moving shoes move out of phase with respect to one another;

wherein each of said two moving shoes has a contact surface with said fragments of meat, which surface is formed so as to tamp in a direction of a reduction in the transverse dimensions of said block of tamped fragments of meat being formed;

wherein said contact surface with said fragments of meat is substantially curved about an axis parallel to said longitudinal conveying direction (D);

wherein said cohesive tamping means comprise means for leveling said block of tamped fragments of meat being formed, arranged upstream of said two moving shoes with respect to a direction of motion of said fragments of meat through said cohesive tamping means for cohesively tamping said fragments of meat, said leveling means comprising a leveling member designed to engage with the upper side of said block of tamped fragments of meat being formed, and means for driving said leveling member following an oscillating rocking motion.

20. A facility for manufacturing a restructured meat element comprising:

means for forming fragments of meat, and a moving support for said fragments of meat designed to convey said fragments of meat in a longitudinal direction (D), through means for cohesively tamping said fragments of meat to form a block of tamped fragments of meat, wherein said cohesive tamping means comprise:

two moving shoes for tamping said fragments of meat between said moving support and said two moving shoes, said two moving shoes being offset with respect to one another transversely with respect to said longitudinal conveying direction (D), and means for driving said two moving shoes, each following an alternating vertical movement such that said two moving shoes move out of phase with respect to one another;

wherein said two moving shoes are aligned transversely with respect to said longitudinal conveying direction (D);

wherein said cohesive tamping means comprise means for leveling said block of tamped fragments of meat being formed, arranged upstream of said two moving shoes with respect to a direction of motion of said fragments of meat through said cohesive tamping means for cohesively tamping said fragments of meat, said leveling means comprising a leveling member designed to engage with the upper side of said block of tamped fragments of meat being formed, and means for driving said leveling member following an oscillating rocking motion.

21. A facility for manufacturing a restructured meat element comprising:

means for forming fragments of meat, and a moving support for said fragments of meat designed to convey said fragments of meat in a longitudinal direction (D), through means for cohesively tamping said fragments of meat to form a block of tamped fragments of meat, wherein said cohesive tamping means comprise:

two moving shoes for tamping said fragments of meat between said moving support and said two moving shoes, said two moving shoes being offset with respect to one another transversely with respect to said longitudinal conveying direction (D), and means for driving said two moving shoes, each following an alternating vertical movement such that said two moving shoes move out of phase with respect to one another;

wherein at least one actuator for the alternating vertical movement of said two moving shoes comprises fluid actuator means connected to said two moving shoes;

wherein said cohesive tamping means comprise means for leveling said block of tamped fragments of meat being formed, arranged upstream of said two moving shoes with respect to a direction of motion of said fragments of meat through said cohesive tamping means for cohesively tamping said fragments of meat, said leveling means comprising a leveling member designed to engage with the upper side of said block of tamped fragments of meat being formed, and means for driving said leveling member following an oscillating rocking motion.

22. A facility for manufacturing a restructured meat element comprising:

a conveyor belt for conveying fragments of meat in a longitudinal direction (D) through a tamper for cohesively tamping said fragments of meat to form a block of tamped fragments of meat, wherein said tamper comprises:

two moving shoes for tamping said fragments of meat between said conveyor belt and said two moving shoes, said two moving shoes being offset with respect to one another transversely with respect to said longitudinal conveying direction (D), and at least one actuator for driving said two moving shoes, each following an alternating vertical movement such that said two moving shoes move out of phase with respect to one another.

* * * * *

UNITED STATES PATENT AND TRADEMARK OFFICE
CERTIFICATE OF CORRECTION

PATENT NO. : 9,723,850 B2
APPLICATION NO. : 14/421691
DATED : August 8, 2017
INVENTOR(S) : Jean Meunier It is certified that error appears in the above-identified patent and that said Letters Patent is hereby corrected as shown below:

In the Specification

Column 1, Lines 37-43, delete the paragraph "The means for forming fragments of meat proposed in WO 2007/085773 make it possible to preserve, relatively satisfactorily, the structure of the lipocytes and of the myofibrils, by forming fragments of meat such that each fragment is in the general shape of a sheet having a surface area between 5 and 10 cm.sup.2 and a thickness between 3 and 9 tenths of a mm."

Column 1, Lines 44-53, delete the paragraph "The means for cohesively tamping the fragments of meat proposed in WO 2007/085773 comprise two conveyor belts for cohesively tamping the fragments of meat. The two tamping belts are arranged one above the other such that the lower belt extends substantially horizontally and the upper belt is inclined with respect to the lower belt. The two tamping conveyor belts converge from upstream to downstream with respect to the direction of motion of the fragments of meat between these belts so as to cohesively tamp the fragments of meat."

Signed and Sealed this
Twelfth Day of September, 2017

Joseph Matal
*Performing the Functions and Duties of the
Under Secretary of Commerce for Intellectual Property and
Director of the United States Patent and Trademark Office*